US008326907B2

(12) United States Patent
Wu et al.

(10) Patent No.: US 8,326,907 B2
(45) Date of Patent: Dec. 4, 2012

(54) METHOD FOR ESTABLISHING A SIMULATING SIGNAL SUITABLE FOR ESTIMATING A COMPLEX EXPONENTIAL SIGNAL

(75) Inventors: Rong-Ching Wu, Dashu Township (TW); Ching-Tai Chiang, Dashu Township (TW); Jong-Ian Tsai, Dashu Township (TW)

(73) Assignee: I Shou University, Dashu Township, Kaohsiung County (TW)

( * ) Notice: Subject to any disclaimer, the term of this patent is extended or adjusted under 35 U.S.C. 154(b) by 1016 days.

(21) Appl. No.: 12/317,419

(22) Filed: Dec. 22, 2008

(65) Prior Publication Data
US 2009/0259706 A1 Oct. 15, 2009

(30) Foreign Application Priority Data

Apr. 14, 2008 (TW) ............................. 97113520 A

(51) Int. Cl.
*G06F 15/00* (2006.01)
*G06G 7/48* (2006.01)
(52) U.S. Cl. ........................................... 708/404; 703/3
(58) Field of Classification Search ........................ None
See application file for complete search history.

(56) References Cited

U.S. PATENT DOCUMENTS 3,859,602 A * 1/1975 Janssen et al. ................. 327/100
6,915,224 B2 * 7/2005 Wu .................................. 702/77

* cited by examiner

*Primary Examiner* — Lewis A Bullock, Jr.
*Assistant Examiner* — Christine Dang
(74) *Attorney, Agent, or Firm* — Kilpatrick Townsend & Stockton LLP

(57) ABSTRACT

A method for establishing a simulating signal suitable for estimating a complex exponential signal includes the following computer-implemented steps: sampling a time domain signal of a physical system to obtain a sampling signal; transforming the sampling signal to a frequency domain signal using Fast Fourier Transform; determining parameters of the frequency domain signal; establishing a simulating signal; establishing a target function which is a deviation of the simulating signal from the sampling signal; obtaining correcting factors; iterating the target function using a gradient method and the correcting factors to obtain three sets of iterated signal parameters; obtaining corrected parameters using quadratic interpolation; and using the corrected parameters to correct the simulating signal, and establishing an updated target function. The simulating signal can be used to estimate dynamic behavior of the physical system if the updated target function converges to a tolerable range.

7 Claims, 3 Drawing Sheets

| TIME DOMAIN SIGNAL | PARAMETERS | ACTUAL VALUE | ESTIMATION OF THE PARAMETERS | | | | |
|---|---|---|---|---|---|---|---|
| | | | ITERATED SIGNAL PARAMETERS | FIRST CORRECTED PARAMETERS SETS | ... | FIFTH CORRECTED PARAMETERS SETS | |
| 59.9Hz | f | 59.9 | 59.89 | 59.899 | ... | 59.899 |
| | A | 14.65 | 14.161 | 14.532 | ... | 14.637 |
| | φ | -2.006 | -1.952 | -2.003 | ... | -2.004 |
| | α | -9.2 | -9.084 | -9.129 | ... | -9.129 |
| 120.0Hz | f | 120 | 120.001 | 120.000 | ... | 120.000 |
| | A | 10.89 | 10.782 | 10.804 | ... | 10.862 |
| | φ | -0.858 | -0.861 | -0.8603 | ... | -0.859 |
| | α | 0 | 0.017 | 0.012 | ... | 0.004 |
| 210.4Hz | f | 210.4 | 210.399 | 210.340 | ... | 210.400 |
| | A | 8.29 | 8.253 | 8.254 | ... | 8.279 |
| | φ | -0.745 | -0.743 | -0.744 | ... | -0.745 |
| | α | 0 | 0.009 | 0.006 | ... | 0.002 |
| 420Hz | f | 420 | 420.031 | 420.047 | ... | 420.006 |
| | A | 6.57 | 6.510 | 6.569 | ... | 6.570 |
| | φ | -1.160 | -1.200 | -1.179 | ... | -1.161 |
| | α | -7.8 | -7.812 | -7.8003 | ... | -7.800 |

FIG. 4

METHOD FOR ESTABLISHING A SIMULATING SIGNAL SUITABLE FOR ESTIMATING A COMPLEX EXPONENTIAL SIGNAL

CROSS-REFERENCE TO RELATED APPLICATION

This application claims priority to Taiwanese Application No. 097113520, filed Apr. 14, 2008, the disclosure of which is incorporated herein by reference.

BACKGROUND OF THE INVENTION

1. Field of the Invention

The present invention relates to a method for establishing a simulating signal suitable for estimating a complex exponential signal, more particularly to a method for establishing a simulating signal suitable for estimating a complex exponential signal using quadratic interpolation for correcting parameters of the simulating signal.

2. Description of the Related Art

Dynamic behavior of a physical system, such as vibration, circuit transient, etc., generally can be described by differential equations. Solutions of the differential equations generally are complex exponential functions. A parameter set of the complex exponential functions includes a frequency parameter, an amplitude parameter, a phase parameter, and a damping parameter. When the damping parameter is zero, a signal of the physical system is periodic. When the damping parameter is not zero, the signal of the physical system is not periodic, and the amplitude of the signal gradually decreases to zero with time. The physical system can be analyzed, simulated, and controlled effectively via estimation of the parameters of the simulating signal of the physical system.

However, there are a picket-fence effect and a leakage effect when transforming the time domain sampling signal of the physical system to a frequency domain signal using Fast Fourier Transform. Thus, discontinuous truncate points of a waveform in the time domain signal cause scattering of energy components in the frequency domain onto adjacent components on the frequency scale. There is thus a need to find more accurate ways of estimating dynamic behavior of physical systems.

SUMMARY OF THE INVENTION

Therefore, an object of the present invention is to provide a method, executed on a computer having a processor and a memory, for establishing a simulating signal suitable for estimating a complex exponential signal, wherein the simulating signal is used to estimate dynamic behavior of a physical system. The method for establishing a simulating signal suitable for estimating a complex exponential signal uses quadratic interpolation for correcting parameters of the simulating signal such that the simulating signal is able to estimate the dynamic behavior of the physical system with higher accuracy.

Accordingly, a computer-implemented method for establishing a simulating signal suitable for estimating a complex exponential signal of the present invention comprises the following steps:

a) sampling a time domain signal of a physical system to obtain a sampling signal, the time domain signal being a complex exponential signal;

b) transforming the sampling signal to a frequency domain signal using Fast Fourier Transform;

c) determining a plurality of parameter sets of the frequency domain signal corresponding to discrete frequency components in a frequency spectrum of the frequency domain signal, each of the parameter sets including a frequency parameter, an amplitude parameter, a phase parameter, and a damping parameter;

d) establishing a simulating signal according to the parameter sets determined in step c);

e) establishing a target function which is a deviation of the simulating signal established in step d) from the sampling signal obtained in step a);

f) obtaining a correcting factor set for each of the parameter sets determined in step c), each of the correcting factor sets including correcting factors that are obtained based upon the target function and that correspond respectively to the frequency parameter, the amplitude parameter, the phase parameter and the damping parameter included in the respective one of the parameter sets;

g) iterating the target function using a gradient method and the correcting factor set obtained in step f) to obtain a set of iterated signal parameters for each of the parameter sets determined in step c);

h) establishing a new target function based upon the set of iterated signal parameters obtained in step g), returning to step f) to obtain another correcting factor set based upon the set of iterated signal parameters obtained in step g) and the new target function obtained in step h), followed by repeating the steps g) and h) until three sets of iterated signal parameters and three new target functions are obtained;

i) for each of the parameter sets determined in step c), obtaining a corrected parameter set corresponding thereto and including corrected parameters that are obtained using quadratic interpolation based upon the three new target functions obtained in step h) and the three sets of iterated signal parameters determined in step g) and that correspond respectively to the frequency parameter, the amplitude parameter, the phase parameter and the damping parameter included in the corresponding one of the parameter sets;

j) using the corrected parameter sets obtained in step i) to correct the simulating signal, and establishing an updated target function corresponding to the corrected simulating signal; and k) determining whether the updated target function established in step j) converges to a tolerable range, and if the updated target function does not converge to the tolerable range, returning to step i) but with the updated target function established in step j) being used to replace one of the three target functions that was used in step i) and that has a largest variance with the updated target function, and with the corrected parameter set obtained in step i) being used to replace one of the three sets of signal parameters that was previously used in step i) and that corresponds to the replaced one of the three target functions, thereby obtaining a new corrected parameter set, followed by repeating steps j) and k) until the updated target function established in step j) converges to the tolerable range.

The simulating signal can be used to estimate dynamic behavior of the physical system if it is determined in step k) that the updated target function converges to the tolerable range.

Moreover, a computer program product of the present invention comprises a machine readable storage medium having program instructions stored therein which when executed cause a system to perform consecutive steps of the method for establishing a simulating signal suitable for estimating a complex exponential signal according to this invention.

The method for establishing a simulating signal suitable for estimating a complex exponential signal according to the present invention is able to obtain precise parameters (including a frequency parameter, an amplitude parameter, a phase parameter, and a damping parameter) of the simulating signal, and thus overcomes the disadvantage of unprecise parameters obtained directly from a frequency spectrum. Moreover, the iterated signal parameters obtained by using the gradient method are fairly precise so that the parameters of the simulating signal which can be used to estimate dynamic behavior of the physical system can be obtained by performing the quadratic interpolation a few times.

BRIEF DESCRIPTION OF THE DRAWINGS

Other features and advantages of the present invention will become apparent in the following detailed description of the preferred embodiment with reference to the accompanying drawings, of which:

FIG. 4 is a table showing an analysis result of estimating a simulating signal for a time domain current signal of impulse response from an underdamping oscillating circuit using the method of the preferred embodiment.

DETAILED DESCRIPTION OF THE PREFERRED EMBODIMENT

Figure 1:
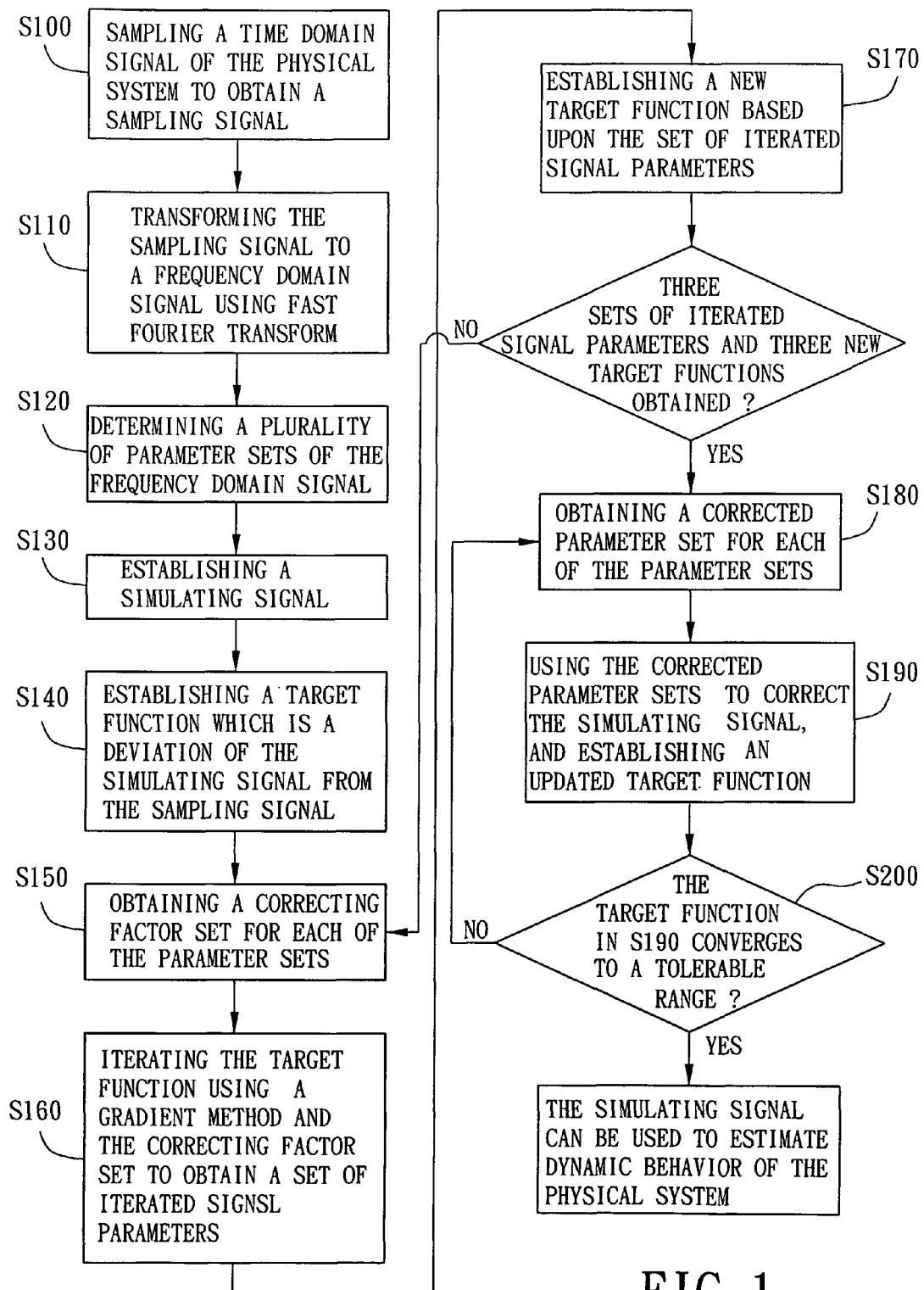
FIG. 1 is a flowchart of the preferred embodiment of a method for establishing a simulating signal suitable for estimating a complex exponential signal of the present invention.

Referring to FIG. 1, the preferred embodiment of a method for establishing a simulating signal suitable for estimating a complex exponential signal of the present invention comprises the following steps.

The first step (S100) is to sample a time domain signal of a physical system to obtain a sampling signal, the time domain signal being a complex exponential signal. First of all, a time domain signal of a physical system that is to be estimated is obtained, followed by sampling the time domain signal according to a predetermined sampling frequency and a predetermined number of sample points to obtain a sampling signal $x_{real}(n)$. To prevent aliasing effect, the sampling frequency must be more than twice the highest frequency of the time domain signal. The number of sampling points must be sufficient to ensure that components in a frequency spectrum of the sampling signal are discernible.

The second step (S110) is to transform the sampling signal to a frequency domain signal using Fast Fourier Transform (FFT). The sampling signal includes several components of different frequencies. Each component in different frequency bands can be separated via frequency spectrum analysis according to the frequency domain signal transformed from the sampling signal using FFT.

Figure 2:
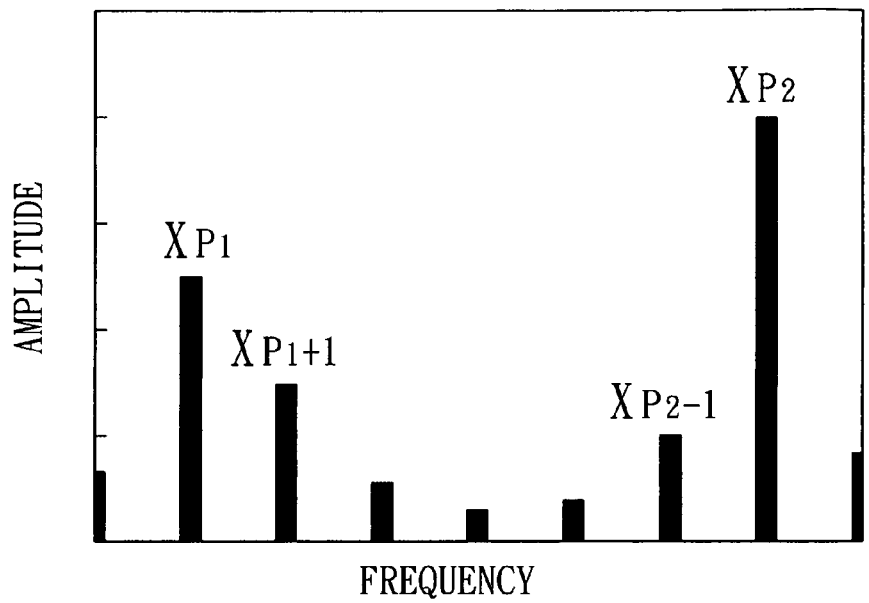
FIG. 2 is an exemplary frequency spectrum for illustrating the method for establishing a simulating signal suitable for estimating a complex exponential signal of the preferred embodiment.

The third step (S120) is to determine a plurality of parameter sets of the frequency domain signal corresponding to discrete frequency components in a frequency spectrum of the frequency domain signal, each of the parameter sets including a frequency parameter, an amplitude parameter, a phase parameter, and a damping parameter. It is hard to avoid errors caused by a picket-fence effect and a leakage effect during FFT, because sampling the time domain signal involves random sampling, and the sampling period is not an integer multiple of the period of the time domain signal of the physical system. Thus, a frequency domain method is used to determine the parameter sets for enhancing stability and ensuring convergence. Referring to FIG. 2, which is an exemplary frequency spectrum for illustrating establishing of the parameter sets in the preferred embodiment, $X_p$ and $X_{p+\epsilon}$ are respectively a largest amplitude and a second largest amplitude of the frequency domain signal corresponding to the scale unit p and scale unit p+$\epsilon$, respectively, and $\epsilon$ is 1 or −1. The frequency parameter $f_k$, the amplitude parameter $A_k$, the phase parameter $\phi_k$, and the damping parameter $\alpha_k$ of each harmonic wave can be determined by the following equations:

$$f_k = \rho + \delta \qquad \text{(Eq. 1)}$$

$$A_k = |X_p / D| \qquad \text{(Eq. 2)}$$

$$\phi_k = \arg(X_p / D) \qquad \text{(Eq. 3)}$$

$$\alpha_k = N\ln|z| \qquad \text{(Eq. 4)}$$

wherein $$\rho = X_{p+\varepsilon}/X_p,\ z = \frac{1-\rho}{1-\rho\exp(-2j\pi\varepsilon/N)},\ \delta = \frac{N}{2\pi}\arg(z),$$

$$D = \frac{1-\exp(-\alpha_k - j2\pi\delta)}{1-\exp((-\alpha_k - j2\pi\delta)/N)},$$

and N is the number of sample points of the time domain signal in step (S100).

The fourth step (S130) is to establish a simulating signal x(n) according to the parameter sets determined in step (S120) by the following equation:

$$x(n) = \sum_{k=1}^{K} A_k e^{\alpha_k n/N} \cos(2\pi f_k n/N + \phi_k) \qquad \text{(Eq. 5)}$$

wherein n ranges from 0 to N−1, and K is a number of the discrete frequency components in the frequency domain signal. The corresponding physical values of the frequency parameter $f_k$ and the damping parameter $\alpha_k$ are $f'_k$ and $\alpha'_k$, and can be determined by the following equations:

$$f'_k = f_k/T \qquad \text{(Eq. 6)}$$

$$\alpha'_k = \alpha_k/T \qquad \text{(Eq. 7)}$$

wherein the T is a sampling period of the sampling signal.

The fifth step (S140) is to establish a target function E which is a deviation of the simulating signal established in step (S130) from the sampling signal obtained in step (S100). The target function corresponding to the simulating signal x(n) can be established by the following equation:

$$E = \frac{1}{E_{base}} \sum_{n=0}^{N-1} (x_{real}(n) - x(n))^2 \qquad \text{(Eq. 8)}$$

wherein $$E_{base} = \sum_{n=0}^{N-1} (x_{real}(n))^2.$$

The sixth step (S150) is to obtain a correcting factor set for each of the parameter sets determined in step (S120). The correcting factor set includes correcting factors that are obtained based upon the target function and that correspond respectively to the frequency parameter, the amplitude parameter, the phase parameter and the damping parameter included in the respective one of the parameter sets. The correcting factors can be obtained by the following equations:

$$\frac{\partial E}{\partial f_k} = \frac{4\pi A_k}{E_{base}} \sum_{n=0}^{N-1} ((x_{real}(n) - x(n)) e^{\alpha_k n/N} \cos(2\pi f_k n/N + \phi_k)) \qquad \text{(Eq. 9)}$$

$$\frac{\partial E}{\partial A_k} = \frac{-2}{E_{base}} \sum_{n=0}^{N-1} ((x_{real}(n) - x(n)) e^{\alpha_k n/N} \cos(2\pi f_k n/N + \phi_k)) \qquad \text{(Eq. 10)}$$

$$\frac{\partial E}{\partial \phi_k} = \frac{-2 A_k}{E_{base}} \sum_{n=0}^{N-1} ((x_{real}(n) - x(n)) e^{\alpha_k n/N} \cos(2\pi f_k n/N + \phi_k)) \qquad \text{(Eq. 11)}$$

$$\frac{\partial E}{\partial \alpha_k} = \frac{2 A_k}{E_{base}} \sum_{n=0}^{N-1} ((x_{real}(n) - x(n)) e^{\alpha_k n/N} \cos(2\pi f_k n/N + \phi_k)) \qquad \text{(Eq. 12)}$$

The seventh step (S160) is to iterate the target function using a gradient method and the correcting factor set obtained in step (S150) to obtain a set of iterated signal parameters for each of the parameter sets determined in step (S120).

The eighth step (S170) is to establish a new target function based upon the set of iterated signal parameters obtained in step (S160), and the flow returns to step (S150) to obtain another correcting factor set based upon the set of iterated signal parameters obtained in step (S160) and the new target function obtained in step (S170). The steps (S160) and (S170) are repeated until three sets of iterated signal parameters and three new target functions are obtained.

The gradient method is used to obtain a minimum value of a multi-variable function, i.e., a value of differential of the multi-variable function at the point of the minimum value is zero. It is assumed that a vector U includes K variables, i.e., $U=(u_1, u_2, \ldots, u_K)$, and the multi-variable function can be expressed as $F=F(U)$. Further, it is also assumed that $U^v$ means iterating the multi-variable function v times, and a gradient of $U^v$ is $\nabla F(U^v)$. A next condition for convergence is $U^{v+1}=U^v-\nabla F(U^v)$. The minimum value of the multi-variable function can be obtained when $\nabla F(U^v)$ is zero via iterating the multi-variable function in the aforementioned manner.

The target function has variables including the frequency parameter $f_k$, the amplitude parameter $A_k$, the phase parameter $\phi_k$, and the damping parameter $\alpha_k$. The sets of the iterated signal parameters (i.e., the next states of the parameters) for each of the parameter sets determined in step (S120) can be obtained via iterating the parameters of the target function using the gradient method and the correcting factor sets obtained in step (S150).

$$f_k^{v+1} = f_k^v - \eta_f \left( \frac{\partial E}{f_k^v} \right) \qquad \text{(Eq. 13)}$$

$$A_k^{v+1} = A_k^v - \eta_A \left( \frac{\partial E}{A_k^v} \right) \qquad \text{(Eq. 14)}$$

$$\phi_k^{v+1} = \phi_k^v - \eta_\phi \left( \frac{\partial E}{\phi_k^v} \right) \qquad \text{(Eq. 15)}$$

$$\alpha_k^{v+1} = \alpha_k^v - \eta_\alpha \left( \frac{\partial E}{\alpha_k^v} \right) \qquad \text{(Eq. 16)}$$

wherein $\eta_A$, $\eta_\phi$, $\eta_f$, and $\eta_\alpha$ are accelerating factors.

Moreover, a new target function based upon the iterated signal parameters can be established according to Equation 8.

Next, the ninth step (S180) is to obtain a corrected parameter set for each of the parameter sets determined in step (S120) using quadratic interpolation. Each corrected parameter set corresponds to one of the parameter sets determined in step (S120), and includes corrected parameters that correspond respectively to the frequency parameter, the amplitude parameter, the phase parameter, and the damping parameter included in the corresponding one of the parameter sets. The quadratic interpolation is based upon the three new target functions obtained in step (S170) and the three sets of iterated signal parameters determined in step (S160).

Figure 3:
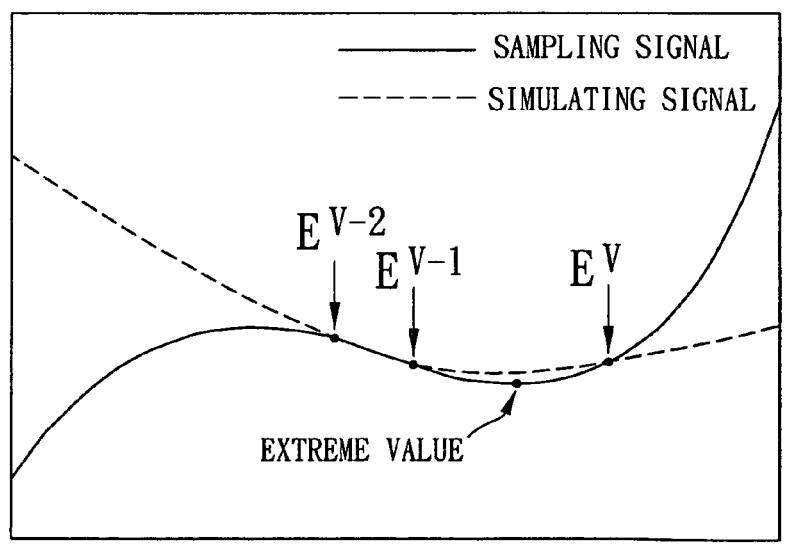
FIG. 3 is a plot for illustrating a quadratic interpolation performed in the method for establishing a simulating signal suitable for estimating a complex exponential signal of the preferred embodiment.

The quadratic interpolation is used to obtain an unknown value of a function at an unknown point by a set of given values of the function at given points. Referring to FIG. 3, it is assumed that there is a set of functions, $[y^{v-2}, y^{v-1}, y^v]$, and target functions corresponding thereto, $[E^{v-2}, E^{v-1}, E^v]$. By a quadratic equation, $E=ay^2+by+c$, the relationship between the functions, $[y^{v-2}, y^{v-1}, y^v]$ and the target functions, $[E^{v-2}, E^{v-1}, E^v]$, can be expressed as $$\begin{bmatrix} E^{v-2} \\ E^{v-1} \\ E^v \end{bmatrix} = \begin{bmatrix} (y^{v-2})^2 & y^{v-2} & 1 \\ (y^{v-1})^2 & y^{v-1} & 1 \\ (y^v)^2 & y^v & 1 \end{bmatrix} \begin{bmatrix} a \\ b \\ c \end{bmatrix} \qquad \text{(Eq. 17)}$$

By an inverse matrix, a, b, and c can be obtained.

$$\begin{bmatrix} a \\ b \\ c \end{bmatrix} = \begin{bmatrix} (y^{v-2})^2 & y^{v-2} & 1 \\ (y^{v-1})^2 & y^{v-1} & 1 \\ (y^v)^2 & y^v & 1 \end{bmatrix} \begin{bmatrix} E^{v-2} \\ E^{v-1} \\ E^v \end{bmatrix} \qquad \text{(Eq. 18)}$$

After differentiating the target function once, $$\frac{dE}{dy^{v+1}} = 2ay^{v+1} + b = 0 \qquad \text{(Eq. 19)}$$

$$y^{v+1} = \frac{-b}{2a} \qquad \text{(Eq. 20)}$$

By the foregoing method, the corrected parameter sets can be obtained.

The tenth step (S190) is to use the corrected parameter sets obtained in step (S180) to correct the simulating signal, and to establish an updated target function corresponding to the corrected simulating signal according to Equation 8.

The eleventh step (S200) is to determine whether the updated target function established in step (S190) converges to a tolerable range. If the updated target function does not converge to the tolerable range, the flow returns to step (S180), but with the updated target function established in step (S190) being used to replace one of the three target functions that was previously used in step (S180) and that has a largest variance with the updated target function, and with the corrected parameter set obtained in step (S180) being used to replace one of the three sets of signal parameters that was previously used in step (S180) and that corresponds to the replaced one of the three target functions, thereby obtaining a new corrected parameter set. Steps (S190) and (S200) are then repeated until the updated target function established in step (S190) converges to the tolerable range. On the other hand, the simulating signal corrected in the step (S190) can be used to estimate dynamic behavior of the physical system if it is determined in step (S200) that the updated target function converges to the tolerable range.

The above is a description of the preferred embodiment of the method for establishing a simulating signal suitable for estimating a complex exponential signal according to the present invention. The following is an example to illustrate the method of the preferred embodiment.

A time domain current signal of impulse response from an underdamping oscillating circuit is expressed as $$x(t) = 14.65e^{-9.2t}\cos(2\pi 59.9t - 2.006) + 10.59\cos(2\pi 120t - 0.858) + 8.29\cos(2\pi 210.4t - 0.745) + 6.75e^{-7.8t}\cos(2\pi 420t - 1.160)$$

The sampling frequency is set as 1024/sec, and the number of sample points is 1024. Referring to FIG. 4, the table in FIG. 4 shows an analysis result of estimating a simulating signal for the time domain current signal of impulse response from the underdamping oscillating circuit using steps (S100) to (S200) of the method of the preferred embodiment. It is noted that the precise parameters can be obtained by iterating only five times in the method of the preferred embodiment. According to the table in FIG. 4, the iterated signal parameters are fairly precise, and the sufficiently precise parameters of the simulating signal that is used to estimate dynamic behavior of the oscillating circuit can be obtained relatively quickly.

It is apparent from FIG. 4 that the iterated signal parameters are fairly precise and the sufficiently precise parameters of the simulating signal can be obtained relatively quickly.

In addition, a computer program product of the present invention comprises a machine readable storage medium having program instructions stored therein which when executed cause a system to perform consecutive steps of the method for establishing a simulating signal suitable for estimating a complex exponential signal according to this invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method, executed on a computer having a processor and a memory, for establishing a simulating signal suitable for estimating a complex exponential signal, the simulating signal being adapted for estimating dynamic behavior of a physical system, said method comprising the following steps:

a) sampling a time domain signal of the physical system to obtain a sampling signal, the time domain signal being a complex exponential signal;
b) transforming the sampling signal to a frequency domain signal using Fast Fourier Transform;
c) determining a plurality of parameter sets of the frequency domain signal corresponding to discrete frequency components in a frequency spectrum of the frequency domain signal, each of the parameter sets including a frequency parameter, an amplitude parameter, a phase parameter, and a damping parameter;
d) establishing a simulating signal according to the parameter sets determined in step c);
e) establishing a target function which is a deviation of the simulating signal established in step d) from the sampling signal obtained in step a);
f) obtaining a correcting factor set for each of the parameter sets determined in step c), the correcting factor set including correcting factors that are obtained based upon the target function and that correspond respectively to the frequency parameter, the amplitude parameter, the phase parameter and the damping parameter included in the respective one of the parameter sets;
g) iterating the target function using a gradient method and the correcting factor set obtained in step f) to obtain a set of iterated signal parameters for each of the parameter sets determined in step c);
h) establishing a new target function based upon the set of iterated signal parameters obtained in step g), returning to step f) to obtain another correcting factor set based upon the set of iterated signal parameters obtained in step g) and the new target function obtained in step h), followed by repeating the steps g) and h) until three sets of iterated signal parameters and three new target functions are obtained;
i) for each of the parameter sets determined in step c), obtaining a corrected parameter set corresponding thereto and including corrected parameters that are obtained using quadratic interpolation based upon the three new target functions obtained in step h) and the three sets of iterated signal parameters determined in step g) and that correspond respectively to the frequency parameter, the amplitude parameter, the phase parameter and the damping parameter included in the corresponding one of the parameter sets;
j) using the corrected parameter sets obtained in step i) to correct the simulating signal, and establishing an updated target function corresponding to the corrected simulating signal; and
k) determining whether the updated target function established in step j) converges to a tolerable range, and if the updated target function does not converge to the tolerable range, returning to step i) but with the updated target function established in step j) being used to replace one of the three target functions that was used in step i) and that has a largest variance with the updated target function, and with the corrected parameter set obtained in step i) being used to replace one of the three sets of signal parameters that was previously used in step i) and that corresponds to the replaced one of the three target functions, thereby obtaining a new corrected parameter set, followed by repeating steps j) and k) until the updated target function established in step j) converges to the tolerable range; whereby, the simulating signal can be used to estimate dynamic behavior of the physical system if it is determined in step k) that the updated target function converges to the tolerable range.

2. The method for establishing a simulating signal suitable for estimating a complex exponential signal as claimed in claim 1, wherein the simulating signal in step d) is represented by the formula $$x(n) = \sum_{k=1}^{K} A_k e^{\alpha_k n/N} \cos(2\pi f_k n/N + \phi_k),$$

wherein N is a number of sample points of the time domain signal in step a), n ranges from 0 to N−1, K is a number of the discrete frequency components in the frequency domain signal, $A_k$ is an amplitude of the $k^{th}$ discrete frequency component, $\phi_k$ is a phase of the $k^{th}$ discrete frequency component, $f_k$ is a frequency of the $k^{th}$ discrete frequency component, and $\alpha_k$ is a damping coefficient of the $k^{th}$ discrete frequency component.

3. The method for establishing a simulating signal suitable for estimating a complex exponential signal as claimed in claim 2, wherein $f_k = \rho + \delta$, $\alpha_k = N \ln|z|$, $\phi_k = \arg(X_p/D)$, and $A_k = |X_p/D|$, wherein $X_p$ and $X_{p+\epsilon}$ are respectively a largest amplitude and a second largest amplitude of the frequency domain signal, $$\rho = X_{p+\varepsilon}/X_p,\ z = \frac{1-\rho}{1-\rho\exp(-2j\pi\varepsilon/N)},\ \delta = \frac{N}{2\pi}\arg(z),$$

$$D = \frac{1-\exp(-\alpha_k - j2\pi\delta)}{1-\exp((-\alpha_k - j2\pi\delta)/N)}, \text{ and}$$

$\varepsilon$ is 1 or −1.

4. The method for establishing a simulating signal suitable for estimating a complex exponential signal as claimed in claim 1, wherein the target function in step e) is represented by $$E = \frac{1}{E_{base}} \sum_{n=0}^{N-1} (x_{real}(n) - x(n))^2,$$

wherein N is a number of sample points of the time domain signal in step a), $x_{real}(n)$ is the sampling signal in step a), $x(n)$ is the simulating signal in step d), and $$E_{base} = \sum_{n=0}^{N-1} (x_{real}(n))^2.$$

5. The method for establishing a simulating signal suitable for estimating a complex exponential signal as claimed in claim 4, wherein the simulating signal in step d) is represented by the formula $$x(n) = \sum_{k=1}^{K} A_k e^{\alpha_k n/N} \cos(2\pi f_k n/N + \phi_k),$$

wherein n ranges from 0 to N−1, K is a number of the discrete frequency components in the frequency domain signal, $A_k$ is an amplitude of the $k^{th}$ discrete frequency component, $\phi_k$ is a phase of the $k^{th}$ discrete frequency component, $f_k$ is a frequency of the $k^{th}$ discrete frequency component, and $\alpha_k$ is a damping coefficient of the $k^{th}$ discrete frequency component.

6. The method for establishing a simulating signal suitable for estimating a complex exponential signal as claimed in claim 5, wherein $f_k = \rho + \delta$, $\alpha_k = N \ln|z|$, $\phi_k = \arg(X_p/D)$, and $A_k = |X_p/D|$, wherein $X_p$ and $X_{p+\epsilon}$ are respectively a largest amplitude and a second largest amplitude of the frequency domain signal, $$\rho = X_{p+\varepsilon}/X_p,\ z = \frac{1-\rho}{1-\rho\exp(-2j\pi\varepsilon/N)},\ \delta = \frac{N}{2\pi}\arg(z),$$

$$D = \frac{1-\exp(-\alpha_k - j2\pi\delta)}{1-\exp((-\alpha_k - j2\pi\delta)/N)},$$

and $\epsilon$ is 1 or −1.

7. A computer program product comprising a non-transitory machine readable storage medium having program instructions stored therein which when executed cause a system to perform consecutive steps of a method for establishing a simulating signal suitable for estimating a complex exponential signal, said method comprising the following steps:

a) sampling a time domain signal of the physical system to obtain a sampling signal, the time domain signal being a complex exponential signal;

b) transforming the sampling signal to a frequency domain signal using Fast Fourier Transform;

c) determining a plurality of parameter sets of the frequency domain signal corresponding to discrete frequency components in a frequency spectrum of the frequency domain signal, each of the parameter sets including a frequency parameter, an amplitude parameter, a phase parameter, and a damping parameter;

d) establishing a simulating signal according to the parameter sets determined in step c);

e) establishing a target function which is a deviation of the simulating signal established in step d) from the sampling signal obtained in step a);

f) obtaining a correcting factor set for each of the parameter sets determined in step c), the correcting factor set including correcting factors that are obtained based upon the target function and that correspond respectively to the frequency parameter, the amplitude parameter, the phase parameter and the damping parameter included in the respective one of the parameter sets;

g) iterating the target function using a gradient method and the correcting factor set obtained in step f) to obtain a set of iterated signal parameters for each of the parameter sets determined in step c);

h) establishing a new target function based upon the set of iterated signal parameters obtained in step g), returning to step f) to obtain another correcting factor set based upon the set of iterated signal parameters obtained in step g) and the new target function obtained in step h), followed by repeating the steps g) and h) until three sets of iterated signal parameters and three new target functions are obtained;

i) for each of the parameter sets determined in step c), obtaining a corrected parameter set corresponding thereto and including corrected parameters that are obtained using quadratic interpolation based upon the three new target functions obtained in step h) and the three sets of iterated signal parameters determined in step g) and that correspond respectively to the frequency parameter, the amplitude parameter, the phase parameter and the damping parameter included in the corresponding one of the parameter sets;

j) using the corrected parameter sets obtained in step i) to correct the simulating signal, and establishing an updated target function corresponding to the corrected simulating signal; and k) determining whether the updated target function established in step j) converges to a tolerable range, and if the updated target function does not converge to the tolerable range, returning to step i) but with the updated target function established in step j) being used to replace one of the three target functions that was used in step i) and that has a largest variance with the updated target function, and with the corrected parameter set obtained in step i) being used to replace one of the three sets of signal parameters that was previously used in step i) and that corresponds to the replaced one of the three target functions, thereby obtaining a new corrected parameter set, followed by repeating steps j) and k) until the updated target function established in step j) converges to the tolerable range; whereby, the simulating signal can be used to estimate dynamic behavior of the physical system if it is determined in step k) that the updated target function converges to the tolerable range.

* * * * *